United States Patent [19]

Hamasaki et al.

[11] Patent Number: 4,485,287

[45] Date of Patent: Nov. 27, 1984

[54] METHOD OF MAKING A HOLE IN A THICK-WALLED METAL MATERIAL

[75] Inventors: Masanobu Hamasaki, Takamatsu; Fumikazu Tateiwa, Kagawa, both of Japan

[73] Assignees: Agency of Industrial Science & Technology; Ministry of International Trade & Industry, both of Tokyo, Japan

[21] Appl. No.: 418,612

[22] Filed: Sep. 16, 1982

[30] Foreign Application Priority Data

Jun. 11, 1982 [JP] Japan .............................. 57-101035

[51] Int. Cl.³ .............................................. B23P 1/06
[52] U.S. Cl. .............................. 219/69 M; 219/69 V; 219/69 W; 219/70
[58] Field of Search ............... 219/69 M, 69 W, 69 V, 219/69 D, 70, 75, 69 E, 383, 384

[56] References Cited

U.S. PATENT DOCUMENTS

| | | | |
|---|---|---|---|
| 2,527,490 | 10/1950 | Adams | 219/70 |
| 2,818,490 | 12/1957 | Dixon | 219/69 E |
| 2,903,557 | 9/1959 | Matulaitis | 219/69 W |
| 2,906,853 | 9/1959 | Sibley | 219/69 W |
| 3,610,865 | 10/1971 | Osenbruggen | 219/69 V |
| 3,619,543 | 11/1971 | Slindee | 219/69 R |
| 3,967,090 | 6/1976 | Hamasaki et al. | 219/70 |
| 4,258,244 | 3/1981 | Rieppel et al. | 219/69 R |
| 4,388,514 | 6/1983 | Coughlin et al. | 219/70 |

FOREIGN PATENT DOCUMENTS

| | | | |
|---|---|---|---|
| 2412203 | 9/1975 | Fed. Rep. of Germany | 219/68 |
| 54-21699 | 2/1979 | Japan | 219/69 R |
| 610709 | 10/1948 | United Kingdom | 219/69 V |
| 1377572 | 12/1974 | United Kingdom | 219/68 |
| 2061141A | 5/1981 | United Kingdom | 68/ |

Primary Examiner—C. L. Albritton
Assistant Examiner—Geoffrey S. Evans
Attorney, Agent, or Firm—Oblon, Fisher, Spivak, McClelland & Maier

[57] ABSTRACT

A process of making a hole in a metal material of a large thickness comprises bringing the tip of an arc electrode wire into contact with the metal material while laterally reciprocating the arc electrode wire to thereby form an entry path on one side of the arc electrode wire and an exit path on the other side of the arc electrode wire within the hole, and causing a pressurized fluid to be introduced into the entry path, guided to the bottom of the hole and the exit path, and discharged out of the hole together with the molten metal lumps.

7 Claims, 15 Drawing Figures

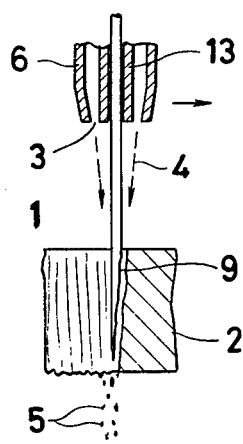
Fig_1 (PRIOR ART)
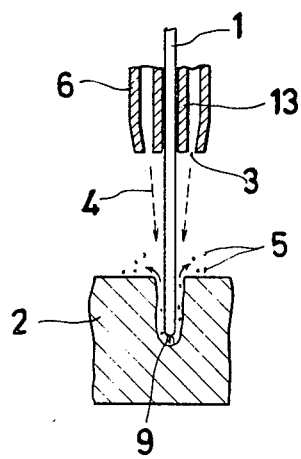
Fig_2 (PRIOR ART)
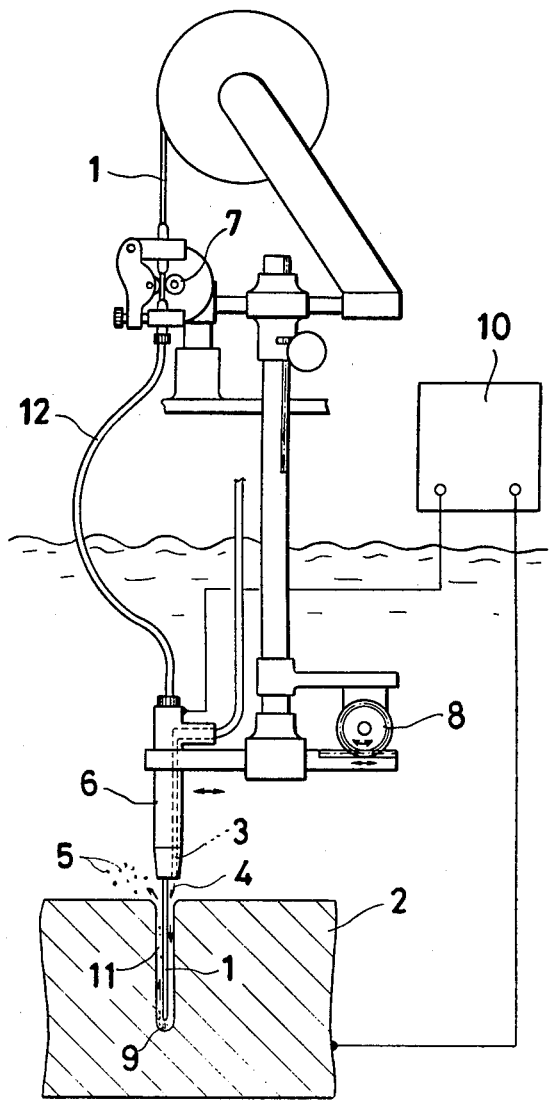
Fig_3

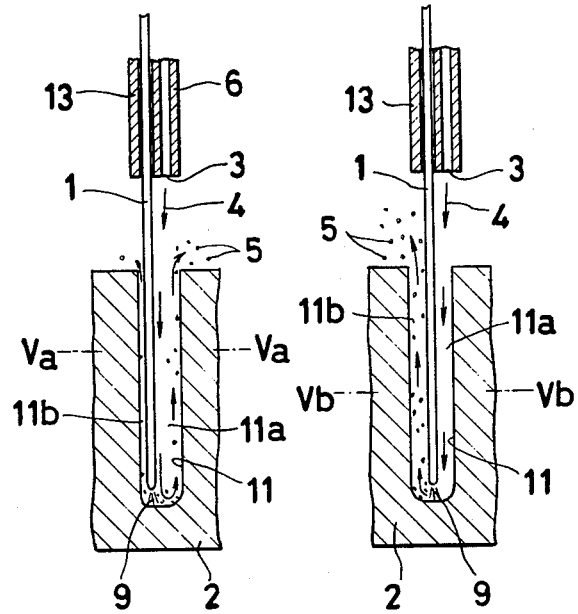 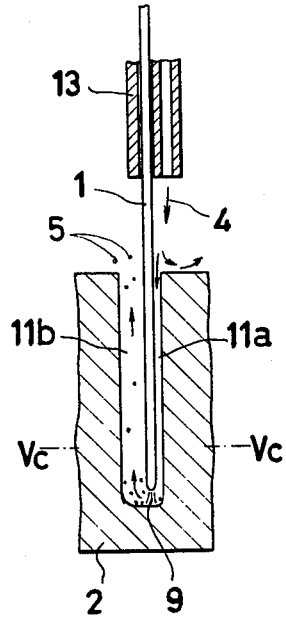 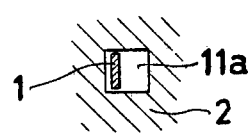 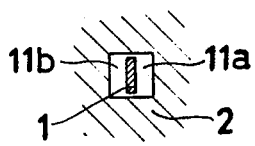 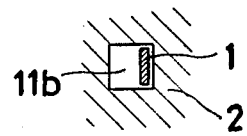 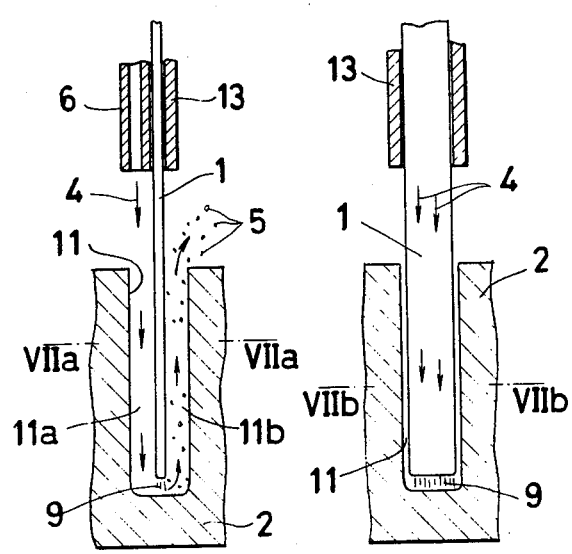 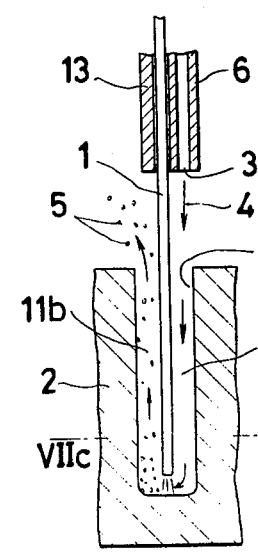 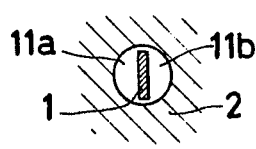 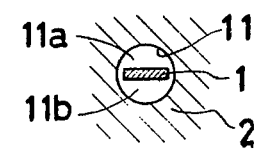 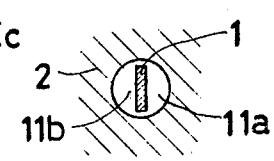

METHOD OF MAKING A HOLE IN A THICK-WALLED METAL MATERIAL

BACKGROUND OF THE INVENTION

At present, no industrially usable process for the underwater drilling a superthick metal plate in excess of 150 mm has yet been developed, and particularly, it is difficult to make a small hole in such a plate having a great wall thickness.

Even a superthick plate can be drilled using a special lengthy drill if a long period of time is taken, but this involves an extremely expensive operation.

In this case, the drill has to be replaced frequently in the course of drilling, and if the drill should break, it is extremely difficult to remove the drill from the hole.

Such drilling of superthick plate is required only in special fields but in these fields is an indispensable process. For example, in the case gas cutting is employed for the underwater disassembly of the pressure vessel of a discarded nuclear reactor, since the pressure vessel is formed from superthick plates, gas cutting cannot be used unless edges or through holes are present.

This is because the principle of gas cutting requires that the matrix be preheated to about 1,000° C. before a flow of cutting oxygen is projected thereonto to utilize the oxidization reaction between iron and the oxygen. However, in the case of a superthick plate, heat is absorbed into the matrix by heat transfer unless an end (edge) or hole edge is present in the plate, and therefore it is hard to apply heat thereto. Even if heating can somehow be realized, when the cutting flow of oxygen is blown to carry out cutting, the cutting chips or molten metal (dross) fly up into the blow-pipe nozzle since there is no place for the chips and dross to escape. Therefore, the nozzle becomes damaged at once. However, if the plate has ends or holes, the cutting chips or molten metal (hereinafter referred as "molten metal") may be readily released to the rear and therefore, cutting can be accomplished.

Since a cylindrical vessel such as the pressure vessel of a reactor has no edges, drilling of start-holes is an indispensable step for application of gas cutting.

If a mechanical process using drills or the like for drilling start-holes to permit use of gas cutting for underwater disassembly of the pressure vessel of a discarded reactor is used as described above, the following problems arise in addition to the aforementioned disadvantages. Namely, the operation takes a long time and the drills have to be replaced frequently. This is disadvantageous in terms of safety because the operators are required frequently and for a relatively long times, to be in contact with tools and parts wet with radioactive water. Furthermore, in the mechanical drilling of the superthick plate, a great pressure must be applied, and therefore, disadvantageously, a large-scale apparatus must be used.

SUMMARY OF THE INVENTION

It is an object of the present invention to provide a process for making a hole in a superthick metal plate under water in a manner similar to that used out of water on the ground.

To achieve the aforesaid object, the present invention provides an improvement in the process for making a hole in a metal plate by an arc from an arc electrode strip or wire (hereinafter referred to as "wire") and by projection of pressurized fluid, wherein the improvement comprises constantly forming by means of the arc electrode wire an entry path and an exit path for the pressurized fluid and blowing the pressurized fluid into the entry path and out the exit path to carry the molten metal produced by the arc in the hole bottom out the exit path along with the pressure fluid. As described above, according to the process of the present invention, since the molten metal at the bottom of the successively formed hole is discharged outside, the hole can be easily formed even in a superthick metal plate, and this operation may be executed either in water or on the ground.

BRIEF DESCRIPTION OF THE DRAWINGS

Other objects and features of the present invention will become apparent from the ensuing detailed description in conjunction with the accompanying drawings.

FIG. 1 illustrates the conventional consumable electrode metal arc cutting process.

FIG. 2 illustrates the state in which the conventional consumable electrode metal arc cutting process is used to make a hole.

FIG. 3 is an explanatory view illustrating one embodiment of the drilling apparatus which can be preferably used to carry out the process of the present invention.

FIGS. 4(A), (B) and (C) illustrate the state in which the electrode wire of the apparatus shown in FIG. 3 is laterally moved to make a hole.

FIGS. 5(A), (B) and (C) are sectional views taken along lines Va—Va, Vb—Vb, and Vc—Vc of FIGS. 4(A), (B) and (C), respectively.

FIGS. 6(A), (B) and (C) illustrate the state in which the electrode wire of the apparatus shown in FIG. 3 is rotated to make a hole.

FIGS. 7(A), (B) and (C) are sectional views taken along lines VIIa—VIIa, VIIb—VIIb and VIIc—VIIc of FIGS. 6(A), (B) and (C), respectively.

DESCRIPTION OF THE PREFERRED EMBODIMENTS

FIG. 1 shows the well known consumable electrode metal arc cutting process. A welding electrode wire is used as the arc electrode wire, an arc 9 is generated between the electrode wire 1 and the matrix metal 2 to fuse the matrix, high pressure water 4 is blown against the molten metal 5, and a torch 6 is moved in the direction indicated by the arrow while the molten metal is blown away to sever the matrix (U.S. Pat. No. 3,967,090).

This process may be used to form a hole in the matrix 2 as shown in FIG. 2. However, in the case of hole formation, the blowing direction of high pressure water is opposite to the direction in which the molten metal 5 is removed. That is, when the high pressure water 4 is concentratedly projected toward the bottom of the hole, the molten metal 5 at the hole bottom, which metal has been formed into small lumps by being cooled by the pressurized water, has no way to escape other than upwardly, and therefore, it is not possible to achieve effective hole formation. Accordingly, the ingoing pressurized water 4 and the outgoing molten metal lumps 5 run counter to each other in the hole, and the maximum depth to which the hole can be formed is limited to 60 mm or so, depending on the diameter thereof.

The present invention relates to an improvement of the aforementioned process and provides a process for effectively making a hole in a superthick metal plate of 300 mm or more. FIG. 3 schematically illustrates one example of an apparatus for carrying out the present invention. This apparatus is substantially the same as that used in the above-described arc cutting process. More specifically, the earth cabtyre cord of an arc power source 10 is connected to the matrix 2 and an arc 9 is generated between an electrode wire 1 and the matrix 2 to fuse the matrix and make a hole. At the same time, the electrode wire 1 is also fused and consumed and therefore the wire 1 is, as it is consumed, continuously fed by means of a feed roller 7 through a conduit 12 to make a hole in the superthick metal plate. In this case, as shown in FIG. 4, a nozzle 3 for pressurized fluid 4 is provided laterally of a contact tip 13 through which electric current is applied to the electrode wire 1 of a torch 6.

In accordance with a first embodiment of the invention, the torch 6 is supported by a reciprocating drive device 8 including a motor and a reduction gear, and the extreme end of the electrode wire 1 is designed so as at all times to be reciprocatingly slidable between predetermined sections along the surface of the matrix 2.

With the structure as described above, electric power is supplied from the arc power source 10 between the electrode wire 1 and the matrix 2 and the electrode and the matrix are brought into contact with each other while projecting pressurized fluid from the nozzle. An arc is thus generated between the electrode wire and the matrix to commence hole formation.

An electrode wire with a rectangular cross-section for automatic welding is used as the arc electrode wire 1, and when the electrode wire is reciprocatingly slid between the predetermined sections along the matrix while being replenished as consumed, a square hole is made as shown in FIGS. 4 and 5. When pressurized fluid is blown along one side of the electrode wire at all times, the hole 11 made by the electrode wire 1 is internally formed with an entry path 11a and an exit path 11b for the pressurized fluid. Molten metal lumps 5 formed by the arc in the hole bottom are successively carried outside the hole by the pressurized fluid as the fluid moves up through the exit path 11b and are projected outside the hole so that an arc can always be generated in a stabilized manner between the electrode wire and the matrix at the hole bottom to provide smooth hole formation.

The hole formation process of the present invention will be further described in detail with reference to FIGS. 4 and 5. The electrode wire 1 (FIGS. 4(A) and 5(A)) on the lefthand side within the hole is laterally moved (FIGS. 4(B) and 5(B)) towards the center by the reciprocating drive device 8, then further moved towards the righthand side (FIGS. 4(C) and 5(C)), and again returned towards the center of the hole. In the figures, only the driving of the torch 6 by the reciprocating drive device 8 in one direction is illustrated. In fact, however, reciprocating movement is repeated so that pressurized fluid projected from the nozzle 3 at the tip of the torch 6 is, in the case of the present embodiment, injected into the hole from the righthand side of the electrode wire 1 along the electrode wire.

When the electrode wire 1 is adjacent the left wall of the hole as shown in FIGS. 4(A) and 5(A), the arc 9 fuses the left portion of the hole bottom to enlarge the hole. The pressurized fluid 4 enters the wide entry path 11a between the wire 1 and the right wall of the hole 11 and only a small amount of water turns to the left from at lower end of the wire 1 into the narrow exit path 11b, and the greater part of the fluid reverses direction in the entry path 11a, flows back and escapes upwardly. Thus, only small number of the molten metal lumps 5 are carried out by the pressurized fluid 4, the arc is stabilized, and the remaining molten metal lumps stay close to the left side at the bottom of the hole 11.

Next, when the wire 1 is moved to the center of the hole 11 as shown in FIGS. 4(B) and 5(B), the entry path 11a assumes substantially the same size as that of the exit path 11b so that the pressurized fluid 4 enters the entry path 11a on the right side of the wire 1. In this state, the upward movement of the fluid through the exit path 11b on the left side is facilitated, and substantially all the molten metal lumps at the hole bottom are carried outside the hole.

When the wire 1 further comes closer to the right wall of the hole 11 as shown in FIGS. 4(C) and 5(C), the entry path 11a is reduced in size to decrease the amount of pressurized fluid injected, thus decreasing the number of the molten metal lumps carried out by the pressurized fluid 4. However, the arc remains stable and fuses the right portion of the hole bottom and the molten metal lumps stay on the bottom closer to the right side of the hole 11. These molten metal lumps are carried outside the hole by the pressurized fluid when the wire 1 is moved towards the center.

That is, the wire 1 is reciprocatingly moved within the hole 11, the bottom of which is continuously fused and deepened until the hole reaches the required dimensions. At the same time, the amount of the molten metal lumps carried out periodically increases and decreases. The maximum expulsion of these lumps is attained when the rod 1 is located in the vicinity of the center of the hole 11 because the wire 1 functions as a partition in the center of the hole 11 and the pressurized fluid entering from one side thereof can escape upwardly from the opposite side without running counter to the inflow. That is, the wire 1 serves as a partitioning wall between the entry path and the exit path for the pressurized fluid 4 to control the flow thereof and, therefore, even if the pressurized fluid turns back at the hole bottom, no counterflow occurs.

In FIG. 4, a wire 1 with a rectangular cross-section is used and, therefore, the hole 11 is square in shape but if a round wire is used, there is formed an oblong hole the shape and size of which depend on the diameter of the wire and the amount of reciprocating movement.

In a test employing the above-described embodiment there was used a wire of a rectangular cross-section having a thickness of 2.4—3.2 mm and a width of 12 mm, and reciprocating movement was carried out at a stroke of 10 mm and a period of 2—20 seconds. In this case a superthick mild steel plate of a thickness of 300 mm was pierced in 10 to 30 seconds. The pressure of the pressurized water as a fluid was only 5–10 kg/cm$^2$ and the amount thereof only 5–10 l/min.

Next, a second embodiment of the present invention will be described with reference to FIGS. 6 and 7. In this embodiment, the wire 1 is rotated to thereby make a circular hole.

In this embodiment, the same torch as used in the embodiment shown in FIG. 4 can be employed, but the reciprocating drive device 8 is replaced by a reciprocating rotational device (not shown). In this embodiment, the wire 1 is reciprocatingly rotated about the axis thereof by means of said reciprocating rotational device. The conduit 12, electric wire, water hose, etc. have flexibility, and therefore, they can be used without modification. Since the rotational drive mechanism used is well known, the construction thereof is not further described. It is designed so that pressurized water is projected along one surface of the electrode wire 1.

In the condition shown in FIGS. 6(A) and 7(A), pressurized fluid 4 enters the entry path 11a formed between the wire 1 and the left wall of the hole 11, turns to the right at the lower end of the wire 1, and moves up through the exit path 11b along the right wall entraining the molten metal lumps. When the hole is formed without rotation of the wire 1, the arc 9 thereof is blown by the pressurized fluid 4 and jumps rightwards at all times to fuse only the right side of the hole 11 so that the hole is top sided. To prevent this, the wire 1 is rotated.

FIGS. 6(B) and 7(B) show the state wherein the wire 1 is rotated by 90° from the state shown in FIGS. 6(A) and 7(A), and FIGS. 6(C) and 7(C) show the state wherein the rod 1 is rotated by 180°. If the rod continues to be rotated in the same direction, the conduit 12, the electric wire and the fluid hose will become twisted, and therefore, the wire is reciprocatingly rotated. In this case, it is desired that after the wire has been rotated by at least 360° in one direction, the direction of rotation be reversed. A suitable period for a complete rotation is from 2 to 10 seconds.

While the present invention has been described by way of the embodiments shown, it is principally characterized in that in forming a hole in a metal material by means of an arc electrode wire, the arc electrode wire is reciprocatingly moved or rotated for advancement thereof to thereby form an entry path and an exit path for a pressurized fluid injected along the electrode wire, and the pressurized fluid which enters the hole along one side of the electrode wire and reaches the hole bottom is able to exit from the hole without impinging upon the in-going fluid. The present invention may be variously changed and applied without alteration of the subject matter thereof. That is, the electrode wire is not limited to the wire for automatic welding but can be a carbon rod, for example. However, since a lengthy carbon rod tends to be snapped, it is desirable to use rods constituted of bundled carbon fibers. In this case, if the outer peripheral portion of the rod is covered with an insulating material and used, attention need not be paid to short-circuiting thereof with the hole wall, as is required in the case of the welding rod. The pressurized fluid used is not limited to water; air, oxygen and other gases may also be used depending on the circumstances. However, the use of water is most effective in providing a clean hole.

This invention is the first to apply to the arc hole formation process the idea of providing entry and exit paths for pressurized fluid in a hole by partitioning these paths from each other by an electrode wire. Since the entering and exiting pressurized fluids do not flow against each other, the ability of the fluid to carry out the molten metal lumps is materially increased to render hole formation in superthick plate possible.

According to the thermal hole formation process of the present invention, for example, the superthick plates of reactor pressure vessels, that is, mild steel or stainless clad steel of 150-250 mm, can be automatically processed by remote control a very short period of time without need for workers to come in contact with tools, parts, etc. wet with radioactive water, and, as a consequence, the safety of the dismantling operation is improved. Further, aluminum and copper alloys incapable of being drilled by gases, tool steel, heat resisting steel and stainless steel incapable of being mechanically drilled, and all other electric conductive materials can be drilled by the method of this invention. Also, this invention makes possible the cutting of a material with a series of holes. Furthermore, hole formation in water or air can be performed equally well and the method can be carried out using almost any of the existing devices.

This invention constitutes an advance in the technique of drilling metal materials in terms of the wide range of materials that can be drilled, high performance in highspeed piercing of even superthick plate, its effect of preventing an increase in the temperature of the material by cooling the interior of the hole, and its high suitability for application to underwater drilling.

What is claimed as new and desired to be secured by Letters Patent of the United States is:

1. A process of making a hole in a metal material by forming an arc and by projection of pressurized fluid, the method comprising the steps of:
   bringing the tip of an arc electrode wire into contact with said metal material while receiprocating said arc electrode wire in a direction lateral to a length of said electrode wire;
   applying between said metal material and said electrode wire an electrical potential sufficient to form an arc therebetween, whereby said electrode wire is consumed and a hole is formed in said metal material;
   projecting a pressurized fluid towards the hole along one side of the exterior of said arc electrode wire; and
   laterally reciprocating the arc electrode wire to thereby form an entry path and an exit path for said pressurized fluid within the hole, whereby the pressurized fluid is introduced into the hole through said entry path, passes to the bottom of the hole to entrain molten metal lumps and exits to the outside together with said lumps through said exit path.

2. The process of claim 1 wherein said arc electrode wire comprises an electrode wire of a flat rectangular cross-section.

3. The process of claim 1 wherein said pressurized fluid is pressurized water.

4. The process of claim 1 including the step of continuously feeding said electrode wire toward said metal material during consumption of said electrode wire by said arc.

5. A process of making a hole in a metal material by forming an arc and by projection of pressurized fluid, the method comprising the steps of:
   bringing the tip of an arc electrode wire of a rectangular cross-section into contact with said metal material while reciprocatingly rotating said arc electrode wire about the axis thereof;
   applying between said metal material and said electrode wire an electrical potential sufficient to form an arc therebetween, whereby said electrode wire is consumed and a hole is formed in said metal material;
   projecting a pressurized fluid towards the hole from one side of the exterior of said arc electrode wire; and
   forming an entry path and an exit path for said pressurized fluid within the hole by said arc electrode wire, whereby the pressurized fluid is introduced into the hole through said entry path, passes to the bottom of the hole to entrain molten metal lumps and exits to the outside together with said lumps through said exit path.

6. The process of claim 5 wherein said pressurized fluid is pressurized water.

7. The process of claim 5 including the step of continuously feeding said electrode wire toward said metal material during consumption of said electrode wire by said arc.

* * * * *